May 17, 1932.  A. LESAGE  1,858,996

CHANGE SPEED GEAR

Filed Jan. 2, 1932

Inventor

Alfred Lesage

Patented May 17, 1932

1,858,996

UNITED STATES PATENT OFFICE

ALFRED LESAGE, OF SCHWEINFURT, GERMANY

CHANGE SPEED GEAR

Application filed January 2, 1932, Serial No. 584,550, and in Germany July 30, 1930.

The invention for which I have filed an application in Germany July 30, 1930, relates to a change speed gear comprising a plurality of associated change speed gear sets, each having a central or sun wheel in the form of a spur gear having the teeth thereof arranged about its peripheral portion, an intermediate gear wheel set sometimes referred to as idler gear set, and an embracing or surrounding wheel having an internally toothed rim, which embracing wheel is sometimes referred to as an internal gear that encircles the sun gear.

The object of the invention is so to construct and combine the several idler gear sets that a small rockable movement will provide for the change by which the one gear of one change gear set will be disconnected, and by which at will another gear of another change gear set can be put into engagement and operation, and vice versa.

This object is attained through the arrangement of intermediate gear sets or idler gear sets—each of which intermediate or idler gear sets is composed, for example, of a pair of idler wheels—located between the sun wheels and the internally toothed wheels of each set of the change gear sets, there being one intermediate or idler gear set for and corresponding to the change speed gear. In the preferred form one wheel or gear of every pair of idler gears is preferably continuously in engagement with the sun wheel and the other with the internally toothed wheel of the change gear set to which the particular pair of idler gears correspond. Further, the one of every pair of idler wheels is rotatably disposed upon a bearing or supporting member fixed in the gear box while the other is rotatably disposed and is carried on a similar bearing or supporting member which is rockable to a limited extent only about the sun gear axis so that such of the latter idler wheels as are supported on or by the rockable supporting member therefor may, by the rocking of their carrier, alternately be brought into engagement with the corresponding idler wheels that are supported on or by the stationary or fixed bearing or supporting member.

A further object of the invention is the special mounting of the change speed gear sets within the crank casing of the motor and its combination with a clutch composed of laminated discs and disposed to transmit power from the motor to a driving sprocket, while permitting gradual engagement.

An embodiment of the invention is illustrated by way of example in the annexed drawings, which form a part of this specification and in which—

Figure 1:
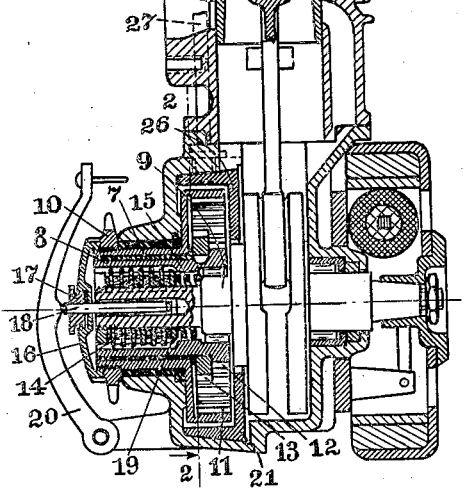
Figure 2:
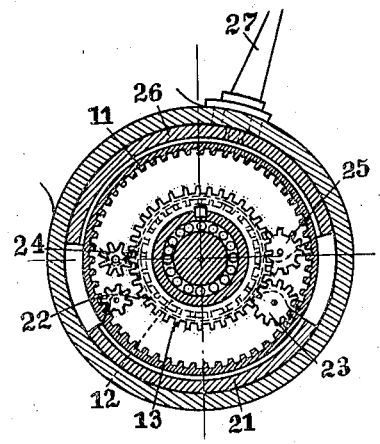

Fig. 1 is an axial sectional elevation of an explosion engine provided with the improved change speed gear, Fig. 2 is a section on line 2—2 of Fig. 1, and Figs. 3 to 5 are diagrammatical views showing three different positions of the movable idler wheels seen in Fig. 2.

Like numerals denote like parts throughout all figures of the drawings.

The change speed gear, or associated change speed gear sets as the mechanism as a whole is sometimes called, is carried by two sleeves 7 and 8 of which the sleeve 7 is located in a crank-shaft bearing formed in the motor casing, whilst the sleeve 8 is relatively rotatably mounted in the sleeve 7. The crank-shaft 9 is mounted by means of an antifriction bearing in the sleeve 8. The sleeve 7 carries upon its end projecting from the casing sprocket wheel 10 from which the drive is transmitted in the rear wheel of a motor cycle or like vehicle. The inner end of the sleeve is widened in the shape of a dish, this widened portion being provided with an internally toothed rim 11. The sleeve 8 carries upon its end located within the toothed rim 11, two toothed wheels 12 and 13 of different diameter of which one wheel, for instance 12, is formed upon the sleeve itself, whilst the toothed rim 13 is keyed to the sleeve. The rim 11 extends over both sun wheels 12 and 13 so that it must be deemed to be composed of two interconnected internal toothings of equal diameter.

In the sleeve 8 is provided a friction clutch 14 comprising alternating discs of known construction which normally establishes the coupling between the sleeve 8 and the shaft 9, it being held closed by a helical spring 15 placed around the shaft 9 and bearing against the last disc of the series. Upon the outer end of the sleeve 7 is screwed a cap 16 which provides a tight closure of the casing at this bearing point. In a central bore of the shaft 9 and in a bore of the cap 16 rendered tight by a stuffing gland 17, is guided a pin 18 which bears with its inner end against a cross-bar 19 guided in a longitudinal slot of the crank-shaft. This bar compresses the spring 15 upon the disengaging pin 18 being forced inwards, thus releasing the clutch 14. The displacement of the pin is effected by means of a lever 20 acting upon the outer end of the pin 18 and being operable by the driver by means of a rod mechanism, a Bowden cable or the like in well known manner.

The change speed gear comprises two toothed transmission planet gears 22 and 23 which are permanently in engagement with the inner toothed rim 11 and are mounted upon a sector 21 fixedly mounted in the crank casing in known manner (Fig. 2). Upon a second sector 26 adapted to be turned or rocked about the axis of the shaft, to wit, about the axis common to the sun gears 12 and 13, and along the inner wall of the casing, are mounted two further toothed idler gears 24 and 25 which are so arranged relatively to each other and to the respective sun wheels that the toothed gear 24 is permanently in engagement with the toothed central gear 13 and the toothed gear 25 is permanently in engagement with the toothed central gear 12, whilst in the end positions of the rockable sector 26 the toothed gears 22 and 24 (Fig. 5) or the toothed gears 23 and 25 (Fig. 4) engage each other, whereby different ratios of transmission are produced. The displacement of the sector 26 is effected by means of a lever 27 attached to the sector and extending outwardly in an airtight manner through a slot of the casing, said lever being operable by the driver by means of suitable transmission devices not shown, but well known in the art. The rockable section 26—including the lever 27 attached thereto—constitutes or provides a means common to pairs or sets of idler wheels, to wit, common to pairs of intermediate or idler gear sets, for selectively causing any one of the idler wheel sets or idler gear sets, as they are frequently called, to functionally cooperate with the sun gear and internal gear corresponding thereto to thereby complete through one of the change gear sets one ratio of transmission for one period and during which period there is no functioning cooperation between a sun wheel, a pair of idler gears, and an internal gear of a set having a different ratio of transmission. In other words, the associated change gear sets have a common means constructed so that any idler gear set in position at a particular time is rendered non-functioning prior to another selected set of idler gears being placed or arranged in functioning position. In fact, the arrangement of said common means associated with the several sets of idler gears is such that between gear changes all of the idler gear sets are non-functioning prior to any one idler gear set being placed in functioning position, but so that when the selected idler gear set is placed in functioning position, power is transmitted from one sun gear then serving as a driving unit through a selected idler gear set to a corresponding internal gear wheel then serving as a driven unit, whereby the power is transmitted through a selected gear change gear set. According to the required reduction, the toothed sun wheels 12 and 13 of the change speed gear receive different diameters. The crank shaft of the engine or motor constitutes what may be termed as a continuously rotating main driving shaft or member. The sprocket wheel 10 constitutes what may be termed an intermittently driven member, to wit—a member driven at a time when the clutch or clutch mechanism is closed through a selected set of the associated change speed gear sets and at a selected speed ratio in respect to the main driving member. The clutch mechanism as usual comprises two functioning clutch elements or members. The construction of the two clutch elements or members, the arrangement of the clutch mechanism as a whole in respect to the rest of the mechanism, and the connection of the main clutch members or elements to certain parts of the mechanism is clearly set forth and described in the foregoing specification. The change speed gear, as previously indicated, is sometimes referred to as associated change speed gear sets and in each of the change speed gear sets there is what may be broadly referred to as a driving unit, a driven unit and idler gear sets constituting selective intermediate gear sets between the driving unit and the driven unit. In the construction described, one of the clutch members is connected to a main driving member, to wit—to the engine shaft 9. The other clutch member is connected to and drives the driving unit or the driving member of the change speed gearing, to wit—the sun gears 12 and 13 when the clutch—which is preferably a friction clutch—is closed. In the change speed gearing described, the parts can be assembled in place so that either the sun gear wheel or the internal gear wheel provides or could provide the driving unit of the change speed gear and likewise the internal gear or the sun gear provides or could provide the driven unit of the change speed gear. It will be noted that in the construction shown and described, the driving and driven units, to wit—the sun gear or sun gear wheel and the internal gear or the internal gear wheel are coaxial. It will also be noted that the rocker or sector 26 that carries and positions certain of the wheels as 24 and 25 of the idler gear sets is rocked—to a limited extent only—about the axis common to the coaxial sun gear and the internal gear.

If four different speeds are required, the arrangement may be duplicated, i. e., two appliances, each composed as here above described and having gradually decreasing diameters, may be placed side by side and adjusted by two levers 27.

Figures 3, 4, 5:
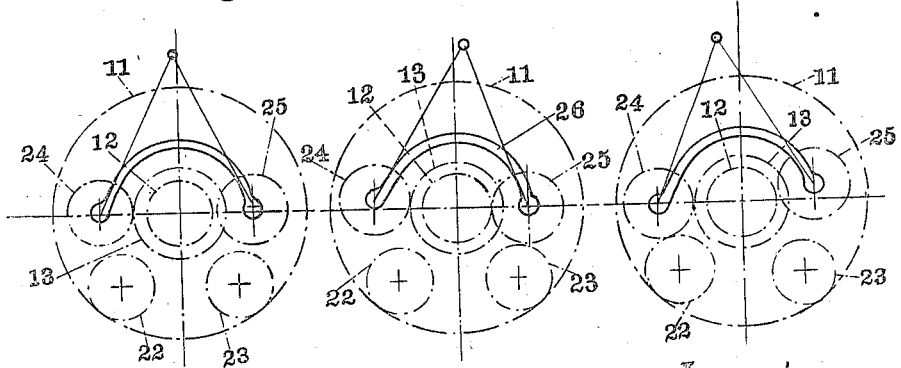

The epicyclic gear just described operates as follows. Figs. 3 to 5 show the positions assumed by the intermediate or planet wheels when setting the gear for the various speeds. The transition from one speed to another always takes place through the idle running position in which both pairs of planet wheels are disengaged (Fig. 3). The clutch 14 may be suitably disengaged during this transition for the purpose of saving the gear. By gradually engaging the friction clutch a smooth start is then attained.

A constructional embodiment of the invention has been illustrated in the drawings and here above described for the purpose of example, but evidently the change speed gear may be devised in different ways.

What I claim as my invention is—

1. Associated change gear sets, each of which sets comprises a rotating sun gear, a rotating internal gear encircling the sun gear and coaxial therewith, and a set of idler gears, said associated change gear sets also having means operatively associated with the idler gear sets, whereby at will all of said idler gear sets will be non-functioning and whereby at will any selected one of the idler gear sets can be arranged in respect to the coaxial sun gear and internal gear corresponding thereto to impart a selected transmission ratio through a change gear set thus selected.

2. Associated change speed gear sets having different ratios of speed and power transmission, each of which sets comprise a rotating sun gear, a rotating internal gear embracing the sun gear and coaxial therewith, and a set of idler gears intermediate the sun gear and the internal gear for transmitting power from the sun gear to the internal gear, said associated change speed gear sets also having means whereby at will all of said sets of idler gears will be in non-functioning position but whereby at will any selected set of idler gears can be caused to assume functioning position for imparting a selected transmission ratio through a set of the associated change gear sets.

3. In combination with and between a main rotating member and an intermittently driven member of a clutch mechanism, and a change speed gear that comprises a driving unit, a driven unit and idler gear sets intermediate said units, said clutch mechanism having one of the clutch elements connected to and driven from said main rotating member and the other clutch element connected for driving, when the clutch is closed, said driving unit, said driven unit being connected for driving said intermittently driven member, said change gear comprising sun gears, an internal gear encircling said sun gears and coaxial therewith, and said idler gear sets, the arrangement of said sun gears, said internal gear, and said idler gear sets being such that there is provided a plurality of change speed gear sets having different ratios, each of which change speed gear sets is for transmitting power and whereby upon selectively arranging said idler gear sets, one set at a time into functioning arrangement, any selected one of the change speed gear sets will be arranged for functioning when said clutch mechanism is closed, said sun gears providing one of said units and the internal gear providing the other of said units.

4. In combination, a rotating main member, an intermittently driven member to be driven according to a selected speed ratio from the rotating main member, a clutch mechanism, and a selective change speed gear comprising a driving unit, a driven unit and idler gear sets, each of which idler gear sets is for transmitting power from the driving unit to the driven unit, one of the clutch elements of the clutch mechanism being connected to the rotating main member, the other clutch element of the clutch mechanism being connected to said driving unit, said driven unit being connected to said intermittently driven member, said selective change speed gear comprising sun gears that constitute one of said units, an internal gear that constitute the other of said units and said idler gear sets, which said sun gears, said internal gear and said idler gear sets serve to provide change speed gear sets having different ratios of transmission, said idler gear sets being controlled so that at will all of the idler gear sets can be arranged in non-functioning position whereat no movement or force will be transmitted from any gear of said driven unit but so that at will any one of the idler gear sets can be arranged so as to transmit power from a selected gear of said driving unit to a selected gear of said driven unit and thus when the clutch is closed, impart from the said rotating main member through the change gear set thus selected, the desired selected speed ratio to said intermittently driven member.

5. A change speed gear comprising a rotatable central sun gear wheel providing a plurality of sun gears, a surrounding internal gear wheel providing in effect a plurality of internal gears, and a plurality of idler gear sets, each of which idler gear sets provide a set of gears intermediate the sun gear wheel and the internal gear wheel for transmitting power from a gear of the sun gear wheel to a gear of the internal gear wheel, said change speed gear having a relatively stationary supporting member and a relatively movable supporting member, upon and by one of which supporting members a gear of each of a plurality of idler gear sets is rotatably mounted and held in engagement with a sun gear corresponding thereto, and upon and by the other of which supporting member another gear of each of a plurality of the same idler gear sets is rotatably mounted and held in engagement with an internal gear corresponding thereto, and means for positioning the movable support so that at one time the movable supporting member can cause the said idler gear sets to be non-functioning but for positioning the movable supporting member so that at another time any selected idler gear on the movable supporting member can be placed and held in functioning position in respect to its corresponding idler gear on the stationary supporting member.

6. A change speed gear set comprising a rotatable central sun gear, a surrounding internal gear, an idler gear set intermediate the sun gear and the internal gear for transmitting power from the one to the other, a relatively stationary supporting member, a relatively movable supporting member, upon one of which supporting members a gear of an idler gear set is rotatably mounted and held in permanent engagement with the sun gear, and upon the other of which supporting members another gear of the idler set is rotatably mounted and held in permanent engagement with the internal gear, and means for moving the movable supporting member at one time to and at another time from a position whereat it holds the idler gear carried thereby in operative engagment with the idler gear carried by the sationary supporting member.

7. A multiple change speed gear comprising a rotatable sun wheel provided with a plurality of sun gears, a rotatable internal gear wheel providing the equivalent of a plurality of internal gears and pairs of idler gears, which sun gears, said internal gear wheel and said idler gears collectively provide change speed gear sets having different ratios of transmission, each pair of idler gears being arranged between a gear of the sun wheel and a corresponding gear of the internal gear wheel to transmit power from one to the other, the gears of each pair of idler gears being capable of relative movement so as to be brought into and out of engagement with each other while one idler gear of each pair is in permanent engagement with its respective internal gear and the other idler gear of each pair is in permanent engagement with its respective sun wheel.

8. In combination, a motor having a crank casing and a crank shaft therein, a multiple change speed gear comprising a sun gear wheel, an internal gear wheel, and idler gear sets, which sun gear wheel, said internal gear wheel and said idler gear set collectively provide change speed gear sets of different ratio of transmission, each idler gear set having one idler gear thereof bodily movable towards and from another idler gear of the set, means for moving an idler gear of any selected idler gear set into and from functioning engagement with respect to its companion idler gears, each idler gear set having one idler gear thereof in permanent engagement with an internal gear corresponding thereto, and another idler gear in permanent engagement with a sun gear corresponding thereto, and a clutch mechanism for connecting and disconnecting one of said gear wheels of the change speed gear and the crank shaft, the crank shaft being mounted on the sun gear wheel and rotatable relative thereto, the sun gear wheel being mounted in the internal gear wheel and rotatable relative thereto, the internal gear wheel being rotatably mounted within and carried by a bearing in the motor casing.

9. A combination such as defined in the claim last preceding in which a relatively stationary supporting member is carried within the motor casing and in which a relatively movable supporting member is carried within the motor casing, on one of which supporting members are carried the idler gears that are in permanent engagement with the internal gears, and on the other of which supporting members are carried the idler gears which are in permanent engagement with the sun gears, and means operable from the exterior of the motor casing for positioning said movable support so that thereby the gears of each idler set can be held separated, thus rendering each idler set functionally inoperative but so that the gears of any one idler set can be selectively brought into operative relationship.

10. In combination, a rotating main member; a clutch mechanism; a selective change speed gear comprising a driving unit and a driven unit and intermediate idler gear sets; and a member to be intermittently driven at a selected speed ratio from the rotating main member; one of the clutch members of the clutch mechanism being connected to the rotating main member, the other clutch member of the clutch mechanism being connected to the driving unit of the selective change speed gear, the driven unit of the selective change gearing being connected to the member to be intermittently driven at a selected speed ratio; said selective change gearing comprising sun gear wheels that constitute one of said units of the change speed gear, an internal gear wheel that constitutes the other of said units of the change speed gear, and sets of intermediate gears or idler gear wheels; said sun wheels, said internal gear wheel and said sets of idler gear wheels serving to provide change speed gear sets having different ratios; said idler gear wheel sets being operatively controlled so that at will all of the idler gear wheel sets can be placed in non-functioning position whereby no movement or force will be transmitted from any gear of the driving unit to a gear of the driven unit but so that at will any one of the sets of idler gear wheels can be positioned so as to transmit power from a selected gear of the driving unit to a selected gear of the driven unit so as to thereby impart from the rotating main member through the selected change speed gear set the desired speed ratio to the member to be intermittently driven.

In testimony whereof I have signed my name to this specification.

ALFRED LESAGE.